(12) United States Patent
Fong et al.

(10) Patent No.: US 7,603,443 B2
(45) Date of Patent: Oct. 13, 2009

(54) GENERIC METHOD FOR DEFINING RESOURCE CONFIGURATION PROFILES IN PROVISIONING SYSTEMS

(75) Inventors: Liana Liyow Fong, Irvington, NY (US); Andrew Julius Greff, Stouffville (CA); Michael Husayn Kalantar, Millwood, NY (US); David George King, Oakville (CA)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 10/650,859

(22) Filed: Aug. 28, 2003

(65) Prior Publication Data

US 2005/0050175 A1    Mar. 3, 2005

(51) Int. Cl.
*G06F 15/177* (2006.01)
*G06F 9/44* (2006.01)

(52) U.S. Cl. ............... 709/220; 708/221; 708/222; 717/168; 717/171; 717/172; 717/173

(58) Field of Classification Search ......... 709/220–222, 709/226; 717/168, 178, 171–173
See application file for complete search history.

(56) References Cited

U.S. PATENT DOCUMENTS

| | | | | |
|---|---|---|---|---|
| 5,522,044 A * | 5/1996 | Pascucci et al. ............. | 709/222 |
| 5,689,652 A * | 11/1997 | Lupien et al. ................. | 705/37 |
| 6,104,796 A | 8/2000 | Kasral ........................ | 379/201 |
| 6,260,062 B1 | 7/2001 | Davis et al. ................. | 709/223 |
| 6,266,811 B1 * | 7/2001 | Nabahi ........................ | 717/174 |
| 6,411,697 B1 | 6/2002 | Creamer et al. ........ | 379/201.12 |
| 6,466,972 B1 * | 10/2002 | Paul et al. ................... | 709/222 |
| 6,499,017 B1 | 12/2002 | Feibelman et al. ............. | 705/8 |
| 6,539,538 B1 * | 3/2003 | Brewster et al. ............ | 717/115 |
| 6,772,204 B1 * | 8/2004 | Hansen ....................... | 709/220 |
| 6,865,737 B1 * | 3/2005 | Lucas et al. ................. | 717/178 |
| 7,054,924 B1 * | 5/2006 | Harvey et al. ............... | 709/220 |
| 7,111,053 B1 * | 9/2006 | Black et al. ................. | 709/223 |
| 7,181,694 B2 * | 2/2007 | Reiss et al. ................. | 715/747 |
| 7,228,537 B2 * | 6/2007 | Murray ....................... | 717/168 |
| 7,299,382 B2 * | 11/2007 | Jorapur ........................ | 714/38 |
| 7,352,853 B1 * | 4/2008 | Shen et al. ............. | 379/201.12 |
| 7,353,262 B2 * | 4/2008 | Styles et al. ................. | 709/221 |
| 7,389,333 B2 * | 6/2008 | Moore et al. ................. | 709/221 |
| 2002/0019864 A1 * | 2/2002 | Mayer ........................ | 709/223 |
| 2002/0087665 A1 * | 7/2002 | Marshall et al. ............. | 709/220 |
| 2002/0169876 A1 | 11/2002 | Curie et al. .................. | 709/226 |
| 2002/0188939 A1 * | 12/2002 | Hediger et al. .............. | 717/174 |
| 2003/0076349 A1 * | 4/2003 | Slaby ......................... | 345/735 |
| 2003/0200541 A1 * | 10/2003 | Cheng et al. ................. | 717/169 |
| 2004/0015957 A1 * | 1/2004 | Zara et al. ................... | 717/174 |
| 2004/0117462 A1 * | 6/2004 | Bodin et al. ................. | 709/220 |
| 2005/0060408 A1 * | 3/2005 | McIntyre et al. ............ | 709/225 |

* cited by examiner

*Primary Examiner*—Nathan J Flynn
*Assistant Examiner*—Joshua Joo
(74) *Attorney, Agent, or Firm*—Yee & Associates, P.C.; William H. Steinberg

(57) ABSTRACT

A generic method and model for capturing and storing configuration profiles for each resource in a provisioning system. As a resource is utilized in a specific environment, the configuration values can be changed as needed to reflect different stages in the life cycle of the resource, such as configuration, and modification.

16 Claims, 4 Drawing Sheets

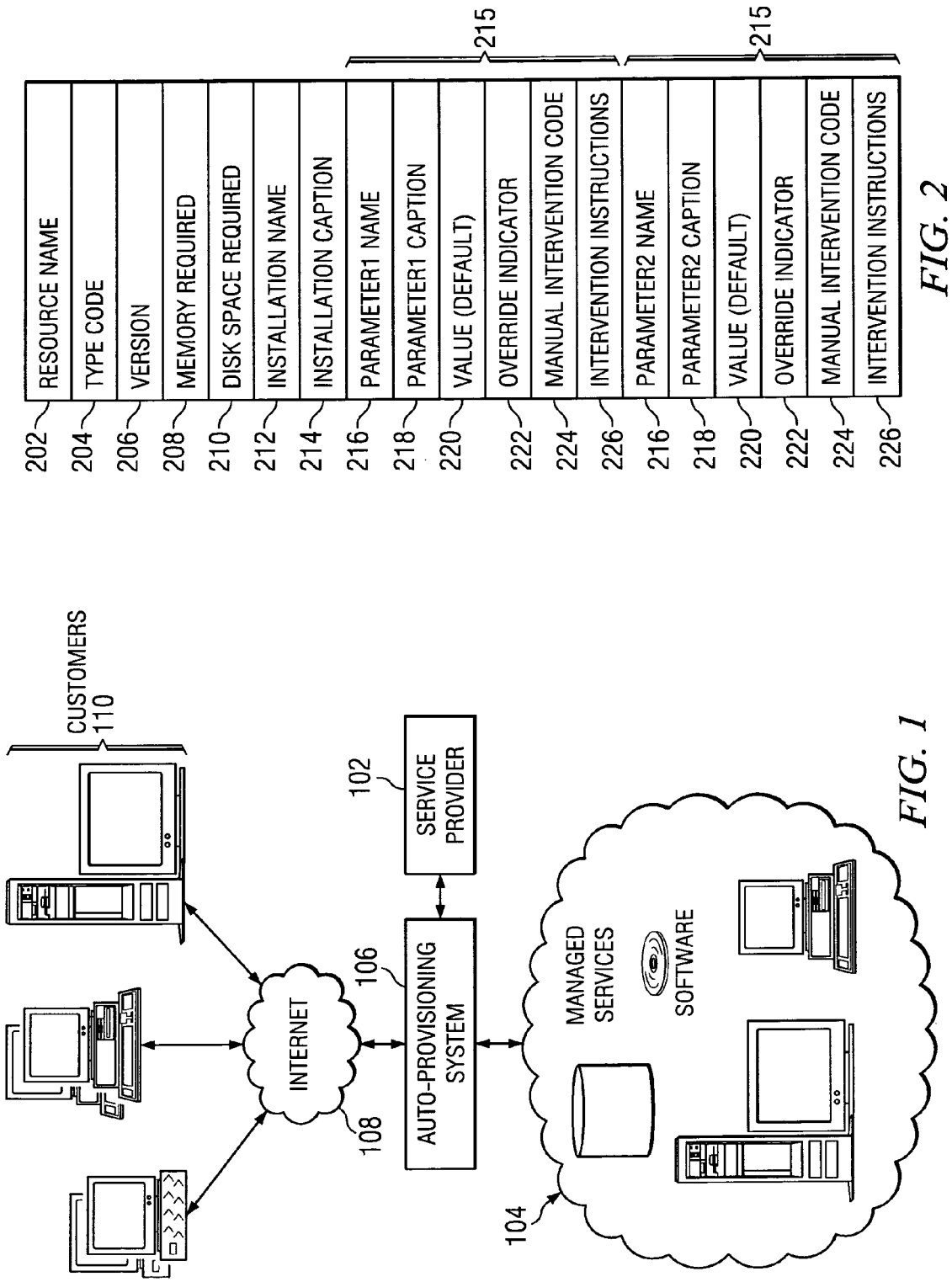

GENERIC METHOD FOR DEFINING RESOURCE CONFIGURATION PROFILES IN PROVISIONING SYSTEMS

BACKGROUND OF THE INVENTION

1. Technical Field

The present invention relates to automated provisioning systems for computer resources. More specifically, the invention relates to a method and system for capturing, storing, and deploying configuration profiles such that computing resources can be configured automatically in provisioning systems for computing resources.

2. Description of Related Art

As businesses attempt to respond more quickly to changing needs and circumstances, there is an increased need for the capability to quickly reallocate resources used in information technology (IT). It is envisioned in one model of computer services that businesses will be able to contract with an IT provider for services. In this model, a provisioning organization will provide computer hardware and software that can be flexibly interconnected to serve a client as long as necessary, but can then be released back to a general pool, or pools, when the need has passed. The provisioning organization can provide equipment and software to a client's site or provide the services through connections to the needed resources at another site. Once the resource is released back to the general pool, or pools, systems can be reconfigured to meet the needs of the next client as necessary.

It is known that the processes associated with adding or reallocating IT resources can be lengthy and tedious. Ideally, an auto-provisioning system can allocate and configure computing resources with little or no human intervention, such that these resources can be placed into or removed from operation quickly and efficiently. Operations personnel can then be relieved of much of the burden of managing an infrastructure consisting of computing resources, making operations more cost effective. Auto-provisioning can also facilitate a more fluid, timely and automated allocation and configuration of resources, allowing management to use more variable and profitable pricing strategies, such as a metered utility service provider might use.

Providing the ability to automatically provision resources is a major challenge, as different resources require not only different parameters, but also different types of parameters for configuration. For instance, to provision information storage equipment, one should know the usage patterns and required levels of response. To provision software, in contrast, one generally needs information regarding the processor memory and the amount of disk storage. Moreover, a parameter for a resource may require different values according to the user environment in which the resource is used. For example, the size allocated to a log file is dependent on traffic patterns, with a low traffic environment requiring less disk space than a high traffic environment.

Current provisioning systems use one of several approaches to the problem. Some provisioning systems support configuration with a fixed set of parameter values. In this case, it is the responsibility of the customer to customize the configuration to their needs. Other systems provide a mechanism to execute configuration scripts during the provisioning process and expect the administrator to provide the necessary scripts and handle the complexity of configuration values. Finally, some systems expect that different configuration scripts will be written for each environment to be provisioned when default configurations are not suitable. It is desirable to have a provisioning system in which the system itself handles as much of the complexity as possible.

SUMMARY OF THE INVENTION

The present invention provides a generic method or model to capture and store a configuration profile template for each resource type. As a resource is installed for a customer, desired values are inserted into a copy of the template to create an instance specific configuration profile. This profile can be saved and the configuration values can be changed as needed to reflect different stages in the life cycle of the resource, such as configuration, modification, and deletion. If a customer desires an installation similar to an existing installation, the configuration profile for the existing installation can be used to create a configuration profile for the new installation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a provisioning system and its relationships to providers, services, and customers.

FIG. 2 depicts an exemplary record layout for a software resource according to an exemplary embodiment of the invention.

DETAILED DESCRIPTION OF THE PREFERRED EMBODIMENT

Figure 3:
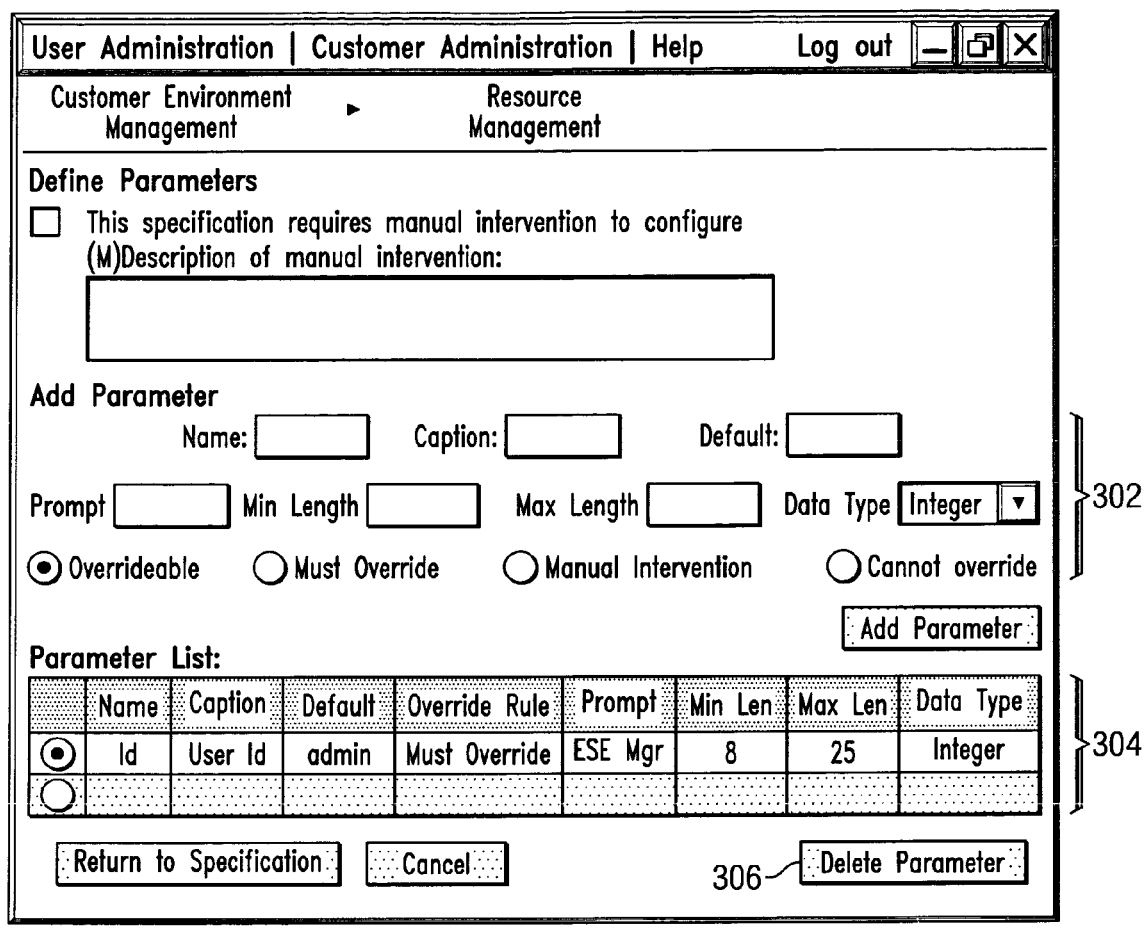
FIG. 3 depicts an exemplary screen used in defining the parameters for a class that is software package in accordance with an embodiment of the present invention.

An embodiment of the invention will now be explained with reference to the figures. Although this embodiment will use software in the examples, it will be understood that one of ordinary skill in the art could modify the invention to provision hardware also.

FIG. 1 depicts the use of an auto-provisioning system to provide services to customers. A service provider 102 offers a variety of managed services 104. These services can include, but are not limited to, servers, terminals, disk space, and a wide variety of software. Customers 110 desiring the services 104 can contact the provider 102 through the Internet 108 or by other means (not shown) such as telephone. The provisioning is then handled by the auto-provisioning system 106. Contractual agreements can take a variety of forms. For example, a customer can contract with the service provider 102 to install a server and terminals at the customer's site, with terminals being added by the provider 102 as the customer 110 adds personnel. Upgrades to the software can be automatically downloaded to the customer's computer by the auto-provisioning system when a request is received. A second customer can have a business in which the computing needs vary considerably over time as different projects are started and finished. This customer can have basic computer equipment on site as necessary, but contract to utilize servers, storage, and software from a service provider for the lifetime of a project. Such a third party provisioning system is described in U.S. Patent Application No. 20020169876, titled "Method and System for Third Party Resource Provisioning Management", which is hereby incorporated by reference.

In order for an auto-provisioning system to work, the system must have information about the available hardware and software, and each of their requirements and possible settings. In order to provide this information, the inventive method provides a configuration profile specification for each resource available, which will be explained in greater detail below. Provisioning systems built using this invention have the capability to dynamically assign override parameters when the resource is provisioned for different environments, and the systems can provision different resources using the same generic mechanism or workflows. In the preferred embodiment, the provisioning system is written in an object oriented programming (OOP) language and those familiar with OOP will recognize that the design of the system reflects the OOP viewpoint.

In the presently depicted embodiment, the computing resources are grouped by types, with the definition of a type having varying degrees of granularity. For example, a coarse granularity can distinguish different types of hardware from software, while a finer level of granularity distinguishes between software for Windows vs. software for DB2 or between operating systems, databases, etc., according to attributes or specifications that are common to the resources in the group. Each make and model of hardware and each version of software programs forms an OOP class. The class defines the basic resource, listing the minimum requirements necessary to use the resource, as well as defining the configuration information that will be needed when the resource is installed. As the class is defined, each piece of information that is necessary to configure the resource is defined as a configuration parameter, with all configuration parameters forming the configuration profile. The class definition, which is stored in a location accessible to the provisioning program, serves as a master template for the associated resource. Later, when a specific instance of the resource is installed, specific parameters for that installation will be incorporated into a copy of the template, used to install the resource, and preferably saved as a record of that installation.

An exemplary embodiment of a class record for a software resource is shown in FIG. 2. As seen, the specification for a software resource contains the name of the resource 202, a software type code 204 (such as operating system, word processor, or game), the version number 206, the amount of memory required to run the software 208, and the disk space required to hold the code 210. Space is allocated in the profile to identify the particular information source for installation in the installation name 212, and the associated source identifier or description for installation caption 214. For example, filename ABC from server XYZ as installation name, and DB2 source as installation caption. Other fields can also be used, as appropriate for the resource and provisioning system. Additionally, this record contains space for the configuration profile, which is the information used when installing the copy. The configuration profile also contains one or more sets of parameters 215. Each parameter 215 can have a parameter name 216, a parameter caption 218, a default value 220, and an override indicator 222 to indicate whether one can override the parameter value, cannot override the value, or must override the default value. Each parameter also contains a manual intervention code 224 to indicate whether or not manual intervention is required during the provisioning process and a field for any intervention instructions 226 (used only when manual intervention is required). Notably, although only two parameters are shown in this example, each resource can have as many parameters as necessary. Some parameters may be applicable to the resource itself, e.g., space to be allocated for work files. Other parameters may be indicators designed to configure the behavior of the provisioning process—the manual intervention code 224 is an example of this type indicator. When configuring resources with such a parameter, a provisioning engine would invoke a manual step if this parameter has a positive value.

The creation of such a class specification is made whenever the provisioning organization acquires a new resource, such as a new software package or a new version of an existing package. The creation of the class specification with default values is preferably made via a graphic user interface (GUI) or other means. FIG. 3 depicts an exemplary GUI used to collect parameter information. The screen prompts the user to enter parameter values at the add parameter section 302. Values of existing parameters are shown in the parameter list 304, from which the user can delete parameters by marking a parameter and clicking on the delete parameter button 306. The resource specifications with their associated configuration profiles are stored in persistent storage, such as a file or database. The provisioning engine and associated programs use the data from this class specification when the resource is installed.

Figure 4B:
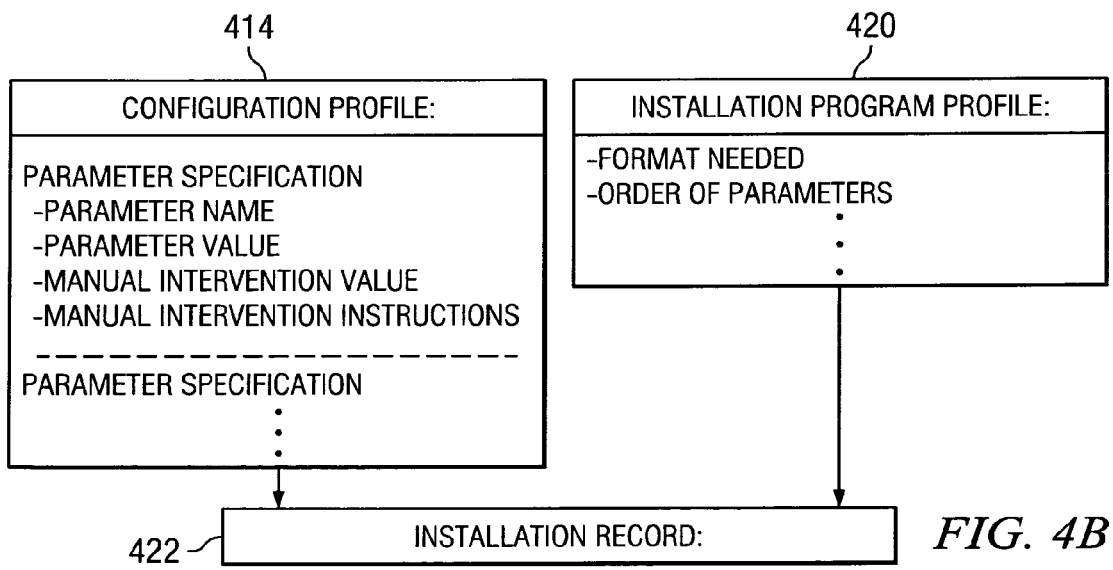
FIG. 4B depicts the formation of an installation record from the new configuration profile and information about the installation program formats.
Figure 4A:
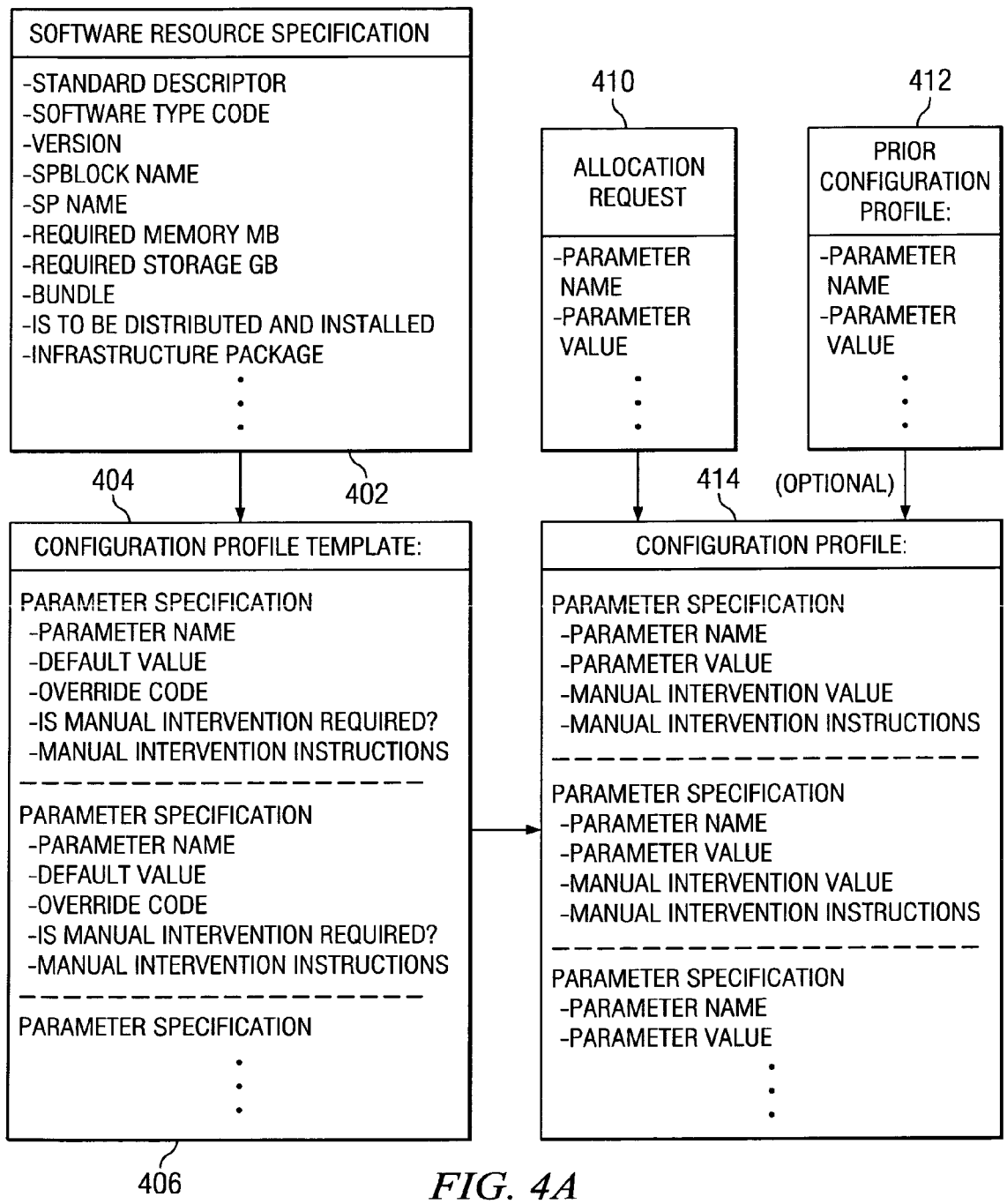
FIG. 4A depicts the formation of a configuration profile for a given installation from the configuration profile template and the allocation request, and optionally from prior configuration profiles, according to an embodiment of the present invention.

FIG. 4A depicts the relationship of the configuration profile template and the configuration profile for a specific installation. In this drawing, the software resource specification 402 provides information regarding the software. The configuration profile template 404 is an extension of the software specification 402. This configuration profile template 404 contains all the configuration parameter specifications 406 that were entered through the screen of FIG. 3, along with their default values. When an installation is to be made using the resource specified in the software specification 402, a software allocation request 410 is submitted. If this is the first use of that resource by this customer, the allocation request 410 will specify values for any parameters for which the customer wants other than the default value. If, however, the customer has a previous installation using this resource, the configuration record 412 for that installation can be optionally accessed to provide information regarding desired values. The software allocation request 410 and optionally the configuration record 412 of the previous installation will provide the needed parameter values for this installation. These parameter values will be inserted into a copy of the configuration profile template 404 to form a new record, the configuration profile 414 that reflects the configuration for this particular installation. This configuration profile 414 is preferably saved in long-term storage so that it can be used again. One final step is necessary before sending the information of the configuration profile 414 to the installation program. A number of different installation programs can be used to install the software, with each installation program expecting to receive the appropriate information in a particular format and in a particular order, although the format and order can change depending on the installation program. In the provisioning system disclosed, information regarding installation programs, their required format, and their required order of input is maintained in storage as an installation program profile 420, seen in FIG. 4B. Using the installation program profile 420, the configuration profile 414 is placed into the correct order and converted to the correct format for the installation program that will install the software, forming an installation record 422. This installation record 422 is sent to the installation program, along with a copy of the software to be installed.

In the preferred embodiment of the invention, the configuration profile 414 can be updated as necessary during the life of the resource. For example, a software program is installed with a given parameter for an operating system release on a computer system. At a future time, if the computer system is updated to a different release of operating system, the saved version of the software configuration profile 414 can be retrieved from storage, updated with the new operating system release, and the program installed on the computer system.

Figure 5:
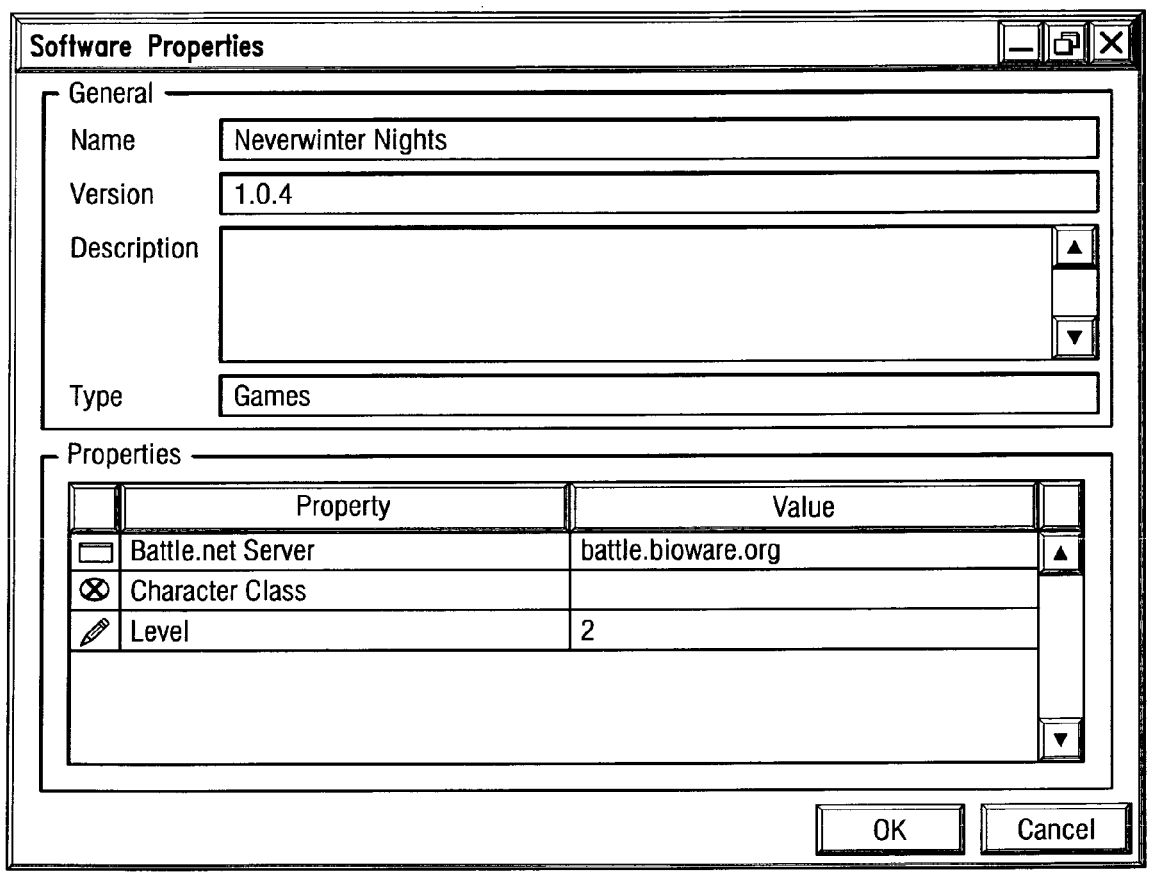
FIG. 5 depicts an exemplary screen used in setting up an instance of a software package in accordance with an embodiment of the present invention.

FIG. 5 depicts an exemplary GUI used to set up a particular installation of a software program, which in this example is a game called Neverwinter Nights, version 1.0.4. The default parameters for the package are presented, with a symbol to the left of the parameter indicating whether or not the user can override the parameter. In this example, an "X" indicates that the user cannot override the parameter, while a pencil indicates that the user must override the parameter.

Although the illustrations in this application were software packages, the resources to be provisioned are not limited to software. A skillful technician can apply this invention to other resources such as physical resources (e.g. server, switch), logical resources (e.g. customer server group, storage allocation), or virtual resource (e.g. virtual machines). Further, modification and/or substitution of the specific elements captured in the configuration profiles can be modified by skillful technicians and is within the scope of this invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of provisioning resources in a data processing system, comprising the steps, for each of a plurality of said resources, of:
    receiving information regarding one of said resources to be provisioned, said information comprising at least
        a resource identifier that is a standard descriptor for the one of said resources,
        a type code that categorizes the one of said resources as a specific type of resource,
        a parameter name for at least one configuration parameter,
        a parameter default value for the at least one configuration parameter,
        an override indicator for said parameter default value specifying whether one can override said parameter default value, cannot override said parameter default value, or must override said parameter default value, and
        a manual intervention indicator where manual intervention is required during provisioning process, with a field containing intervention instructions when manual intervention is required;
    formatting said information into a standard format to form a configuration profile template for a type of resource corresponding to the one of said resources, and wherein resources are grouped by resource types;
    storing said configuration profile template in a location that is available to a provisioning application, wherein a plurality of configuration profile templates are created for a plurality of types of resources, and wherein said plurality of configuration profile templates serve as master templates for said plurality of types of resources;
    receiving a provisioning request for the one of said resources from a customer, wherein said provisioning request includes parameter values specified by said customer for installing a current instance of the one of said resources;
    retrieving said configuration profile template corresponding to said type code of the one of said resources and a previously saved configuration profile corresponding to a previous installation of the one of said resources and said customer; and
    dynamically combining data from each of said provisioning request, said configuration profile template, and said previously saved configuration profile to form a new configuration profile for said current instance of the one of said resources, wherein said new configuration profile is formed by copying said configuration profile template to retrieve said parameter default value for the at least one configuration parameter corresponding said type code of the one of said resources and inserting said parameter values from said provisioning request into said new configuration profile and inserting additional parameter values from said previously saved configuration profile into said new configuration profile.

2. The method of claim 1, wherein said plurality of configuration profile templates are stored in persistent storage.

3. The method of claim 1, further comprising updating at least one configuration parameter of a configuration profile.

4. The method of claim 1, further comprising formatting the information contained in said configuration profile into an order and a format required by an installation program to form an installation record and forwarding said installation record to said installation program.

5. A method of provisioning resources in a data processing system, the method comprising the steps, for each of a plurality of said resources, of:
  receiving information regarding one of said resources to be provisioned, wherein said information includes a type code that categorizes the one of said resources as a specific type of resource;
  formatting said information into a standard format to form a configuration profile template for a type of resource corresponding to the one of said resources, and wherein resources are grouped by resource types;
  storing said configuration profile template in a location that is available to a provisioning application, wherein a plurality of configuration profile templates are created for a plurality of types of resources, and wherein said plurality of configuration profile templates serve as master templates for said plurality of types of resources;
  receiving a provisioning request for the one of said resources from a customer, wherein said provisioning request includes parameter values specified by said customer for installing a current instance of the one of said resources;
  retrieving said configuration profile template corresponding to said type code of the one of said resources and a previously saved configuration profile corresponding to a previous installation of the one of said resources and said customer; and
  dynamically combining data from each of said provisioning request, said configuration profile template, and said previously saved configuration profile to form a new configuration profile for said current instance of the one of said resources, wherein said new configuration profile is formed by copying said configuration profile template to retrieve a parameter default value for a configuration parameter corresponding to said type code of the one of said resources and inserting said parameter values from said provisioning request into said new configuration profile and inserting additional parameter values from said previously saved configuration profile into said new configuration profile.

6. The method of claim 5, wherein said plurality of configuration profile templates are stored in persistent storage.

7. The method of claim 5, further comprising updating at least one configuration parameter of a configuration profile.

8. The method of claim 5, further comprising formatting the information contained in said configuration profile into an order and a format required by an installation program to form an installation record and forwarding said installation record to said installation program.

9. An apparatus for provisioning resources in a data processing system, comprising:
  a memory; and
  a processor, the processor comprising for each of a plurality of said resources:
  means for receiving information regarding one of said resources to be provisioned, wherein said information includes a type code that categorizes the one of said resources as a specific type of resource;
  means for formatting said information into a standard format to form a configuration profile template for a type of resource corresponding to the one of said resources, and wherein resources are grouped by resource types;
  means for storing said configuration profile template in a location that is available to a provisioning application, wherein a plurality of configuration profile templates are created for a plurality of types of resources, and wherein said plurality of configuration profile templates serve as master templates for said plurality of types of resources;
  means for receiving a provisioning request for the one of said resources from a customer, wherein said provisioning request includes parameter values specified by said customer for installing a current instance of the one of said resources;
  means for retrieving said configuration profile template corresponding to said type code of the one of said resources and a previously saved configuration profile corresponding to a previous installation of the one of said resources and said customer; and
  means for dynamically combining data from each of said provisioning request, said configuration profile template, and said previously saved configuration profile to form a new configuration profile for said current instance of the one of said resources, wherein said new configuration profile is formed by copying said configuration profile template to retrieve a parameter default value for a configuration parameter corresponding to said type code of the one of said resources and inserting said parameter values from said provisioning request into said new configuration profile and inserting additional parameter values from said previously saved configuration profile into said new configuration profile.

10. The apparatus of claim 9, wherein said plurality of configuration profile templates are stored in persistent storage.

11. The apparatus of claim 9, further comprising means for updating at least one configuration parameter of a configuration profile.

12. The apparatus of claim 9, further comprising means for formatting the information contained in said configuration profile into an order and a format required by an installation program to form an installation record and means for forwarding said installation record to said installation program.

13. A computer program product for provisioning resources in a data processing system, the computer program product comprising:
  a computer readable storage medium having instruction embodied thereon;
  for each of a plurality of said resources:
  instructions for receiving information regarding one of said resources to be provisioned, wherein said information includes a type code that categorizes the one of said resources as a specific type of resource;
  instructions for formatting said information into a standard format to form a configuration profile template for a type of resource corresponding to the one of said resources, and wherein resources are grouped by resource types;
  instructions for storing said configuration profile template in a location that is available to a provisioning application, wherein a plurality of configuration profile templates are created for a plurality of types of resources, and wherein said plurality of configuration profile templates serve as master templates for said plurality of types of resources;
  instructions for receiving a provisioning request for the one of said resources from a customer, wherein said provisioning request includes parameter values specified by said customer for installing a current instance of the one of said resources;
  instructions for retrieving said configuration profile template corresponding to said type code of the one of said resources and a previously saved configuration profile corresponding to a previous installation of the one of said resources and said customer; and instructions for dynamically combining data from each of said provisioning request, said configuration profile template, and said previously saved configuration profile to form a new configuration profile for said current instance of the one of said resources, wherein said new configuration profile is formed by copying said configuration profile template to retrieve a parameter default value for a configuration parameter corresponding to said type code of the one of said resources and inserting said parameter values from said provisioning request into said new configuration profile and inserting additional parameter values from said previously saved configuration profile into said new configuration profile.

14. The computer program product of claim 13, wherein said plurality of configuration profile templates are stored in persistent storage.

15. The computer program product of claim 13, further comprising instructions for updating at least one configuration parameter of a configuration profile.

16. The computer program product of claim 13, further comprising instructions for formatting the information contained in said configuration profile into an order and a format required by an installation program to form an installation record and instructions for forwarding said installation record to said installation program.

\* \* \* \* \*